United States Patent
Pierson et al.

(10) Patent No.: US 6,265,091 B1
(45) Date of Patent: *Jul. 24, 2001

(54) MODULAR ELECTRIC STORAGE BATTERY

(75) Inventors: John R. Pierson, Brookfield; Michael G. Andrew, Wauwatosa; James J. Bolstad, Shorewood; James T. Daley; William P. Segall, Jr., both of Grafton, all of WI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/870,803

(22) Filed: Jun. 6, 1997

(51) Int. Cl.[7] .................................................. H01M 2/10
(52) U.S. Cl. ................................. 429/1; 429/94; 429/99; 429/100; 429/159; 429/178; 320/104; 320/113; 439/500
(58) Field of Search ............................... 429/159, 1, 100, 429/99, 176, 178, 160, 94; 320/104, 113; 439/500

(56) References Cited

U.S. PATENT DOCUMENTS

| 3,814,632 | * | 6/1974 | Miyagawa | 429/160 |
|---|---|---|---|---|
| 4,074,017 | * | 2/1978 | Kinsey | 429/160 X |
| 4,160,857 | * | 7/1979 | Nardella et al. | 429/99 X |
| 4,756,978 | * | 7/1988 | Nitcher et al. | 429/1 |
| 4,883,725 | * | 11/1989 | Gerard | 429/159 X |
| 5,301,765 | * | 4/1994 | Swanson | 180/68.5 |
| 5,667,907 | * | 9/1997 | Audit et al. | 429/94 |
| 5,760,569 | * | 6/1998 | Chase, Jr. | 320/104 |
| 5,764,025 | * | 6/1998 | Lehmann | 320/2 |

FOREIGN PATENT DOCUMENTS

| 3150652 | * | 6/1983 | (DE) | B60K/1/04 |
|---|---|---|---|---|
| 0677413 | * | 10/1995 | (EP) | B60K/1/04 |

* cited by examiner

Primary Examiner—John S. Maples
(74) Attorney, Agent, or Firm—Quarles & Brady LLP (57) ABSTRACT

A modular electric storage battery is adaptable to a variety of applications, and for example, as a starting, lighting and ignition (SLI) battery of a car, truck, motorcycle, lawn and garden equipment or other internal combustion engine powered product. The modular battery is constructed from a plurality of battery cells assembled into a battery housing. The cells are sealed, maintenance-free, rechargeable cells. The housing includes quick connect termination, and the starting application is adapted with a base unit having complementary termination. The modular battery and base unit also include aligning features to ensure proper interconnection of the battery terminals. The base unit may be adapted to receive several sizes of modular battery. In addition, a second modular battery, that may be configured as a flashlight or other device, is provided and can interconnected with the base unit to provide a jump starting capability.

29 Claims, 11 Drawing Sheets

MODULAR ELECTRIC STORAGE BATTERY

FIELD OF THE INVENTION

The present invention relates generally to electric storage batteries, and more particularly, to a modular electric storage battery adaptable for a variety of applications.

BACKGROUND OF THE INVENTION

Existing starting, lighting and ignition (SLI) batteries of the type commonly used to start the internal combustion engines of cars, trucks, motorcycles, lawn and garden equipment and the like are large, heavy, flooded electrolyte type lead-acid batteries. These batteries consist almost exclusively of a prismatic container into which a number of partitions are formed in order to define cells. Stacks of electrodes, made from interleaved positive and negative plates and separator material, are inserted into the cells and are electrically interconnected and connected with either top or side terminal mounts. The plates are typically lead or lead alloy grids covered with an active material such as lead dioxide. The cells are flooded with electrolyte, usually a dilute sulfuric acid solution, and a cover is heat sealed to the container. Vents are provided in the cover to allow for the venting of gases generated during the normal discharge and recharge cycles.

A typical SLI battery can weigh as much as twenty (20) kilograms. The construction also requires careful top-up mounting to avoid spillage of electrolyte. Because of its size, the use of liquid electrolyte, venting and other concerns, the SLI battery has typically been mounted within the engine compartment of cars and trucks. However, it is known that battery life is adversely affected by heat and vibration so the engine compartment is actually an undesirable location. In addition, the size, weight, liquid electrolyte and gassing makes replacing worn or discharged batteries a task best left to a skilled mechanic. Jump starting a vehicle when the battery is discharged poses certain problems, and requires a second vehicle or energy source.

Thin metal film battery technology provides in a compact design a high power battery cell. Cells of this type are well known and their construction and manufacture have been described in, for example, U.S. Pat. Nos. 3,494,800; 5,045,086; 5,047,300; 5,198,313 and 5,368,961 the disclosures of which are hereby expressly incorporated herein by reference. A thin metal film battery cell includes thin metal film plates sealed within a sealed cell container which is valve regulated. The cells include absorptive glass-mat (AGM) separator technology in an electrolyte starved system. The thin metal film plates are made from very thin lead foil approximately about 0.005 inches thick, pasted with an active material forming a pasted plate approximately about 0.012 inches thick. The plates are spiral wound with separator material, and terminations are cast-on or soldered to the ends of the spiral roll. The roll is encapsulated in a container which is filled with electrolyte and then sealed except for the vent. The performance characteristics of thin metal film cells include a high power weight ratio and rapid recharge capability.

In spite of the existence of alternate cell technology, the typical SLI battery remains a large, heavy, flooded electrolyte battery. Such SLI battery construction has left little flexibility to the car, truck or other product designer in packaging and protecting the SLI battery. Cars and trucks still find large, heavy SLI batteries located in the harsh under-hood environment.

In certain instances which can not be totally avoided, the SLI battery may become discharged such that it can not provide sufficient energy to start the engine of the car, truck or other product. The common response to this problem is to couple a second energy source, such as the electrical system of a second vehicle or a specially designed jump starting energy source, to the SLI battery. When coupled, the second energy source provides the energy to start the engine, and once running, the engine is capable of providing energy through a suitable charging system for recharging the discharged SLI battery. However, one must be careful to properly couple the energy sources. Failing to do so can lead to serious damage to the electrical system of the vehicle, the SLI battery and the second energy source. In the discharged battery situation, with a typical SLI battery it is highly impractical but would be very desirable to simply remove the discharged battery and replace it with another battery having sufficient charge to start the engine. Unfortunately, however, the typical large, heavy SLI battery is not readily removed or uncoupled from the vehicle. And, without a second energy source, the vehicle operator will be stranded.

SUMMARY OF THE INVENTION

A preferred embodiment of the present invention provides a modular electric storage battery capable of functioning as an SLI battery for a car or truck or adaptable to a number of other applications. The modular battery is maintenance free and sealed such that use and handling is greatly simplified. In some applications, the modular battery provides up to a 75 percent weight savings over traditional battery designs. The modular battery includes quick coupling terminals and is adapted to couple into a base unit adapted to a given application for supplying electrical energy thereto.

In another embodiment of the present invention, base units and modular batteries are designed to be interchangeable. That is, the base units include terminal posts and aligning features. Likewise, the modular batteries include terminals and complementary aligning features. The terminals are designed to couple without the use of tools. The base units may be designed to accept one of several sizes of modular batteries (for example the base unit would be designed to accept 1.2, 2.4, 4.8, etc. amp hour capacity modular batteries).

The base units may be configured to be installed and coupled into the electrical system of a motor vehicle such as a car, truck, motorcycle or lawn and garden tractor. A modular battery is plugged into the base unit for providing starting energy. This modular design offers a number of potential advantages. First among these is a very easy ability to replace a worn or discharged battery, or to install a higher capacity battery if necessary. In the event of battery discharge, as opposed to jumping, the discharged battery may be easily removed and a fresh battery plugged in to start the vehicle.

In still another preferred embodiment of the present invention, the vehicle may be adapted with a second base unit and a second modular battery. The second base unit is coupled into the vehicle electrical system so that the second modular battery plugged into the unit is maintained at a full state of charge. The second modular battery can then be used in jump starting situations by exchanging it for the starter modular battery. The second modular battery unit is also adapted to function with a number of accessory items. For example a lantern or flashlight attachment, a power wrench attachment, television or other portable electronic device and the like. The second modular battery unit may also be specially configured as, for example, a flashlight or similar item in which case an attachment is not necessary for providing the additional function.

In still an additional embodiment of the present invention, the base units form an integral part of the fuse block of an automotive electrical system or are installed as part of interior components. In this regard, the base unit may be made part of, for example, the instrument panel, the door trim panels or the seat structures of the vehicle. Thus it will be appreciated that the modular battery greatly frees the vehicle designer from the design constraints associated with the typical SLI battery.

These and other advantages and applications of the present invention will be appreciated by one of ordinary skill in the art from the following detailed description of the preferred embodiments and the attached drawings.

DETAIL DESCRIPTION OF THE PREFERRED EMBODIMENTS

The present invention is described in terms of preferred embodiments and particularly in an exemplary modular battery adapted for use as a starting, lighting and ignition (SLI) battery for starting the internal combustion engines of cars, trucks, motorcycles, marine craft, air craft, snowmobiles, all-terrain vehicles, tractors, lawn and garden equipment or other internal combustion engine powered products. The modular battery is constructed from a plurality of battery cells assembled into a battery housing. The cells are sealed, maintenance-free, rechargeable cells and preferably thin metal film battery cells. The modular battery includes quick connect termination, and the starting application is adapted with a base unit having complementary termination. The modular battery and base unit also include aligning features to ensure proper interconnection of the battery terminals. The base unit may be adapted to receive several sizes of modular battery. In addition, a second modular battery, that may be configured as a flashlight or other device, is provided and can inter-connected with the base unit to provide a jump starting capability.

Throughout the following description like reference numerals are used to describe like elements. Referring then to FIGS. 1–4, modular battery 10 includes a housing 12 into which a plurality of battery cells 14 are inserted. A top member is not shown in the figures, but it will be appreciated by one of ordinary skill in the art that a top member may be secured to housing 12 by bonding, heat sealing or any other suitable means for enclosing housing 12. The top member was omitted from the FIGS. 10 to facilitate illustration of the component members of modular battery 10. Housing 12 is preferably formed from a thermoplastic material such as polypropylene as would be the top member.

Battery cells 14 are preferably thin metal film lead-acid battery cells of the type shown and described in the aforementioned United States patents. It should be understood, however, that the principals of the present invention may be employed with other battery cell formats without departing from its fair scope. Battery cells 14 include positive and negative terminations 16 and 18 at opposing ends, respectively, which are interconnected in series via straps 20. Battery cells 14 are further connected to positive and negative terminals 22 and 24, respectively, to form a 12 volt, 1.2 amp hour capacity D battery. Battery cell 14 interconnection is further illustrated in FIG. 3 with additional straps 20 shown in phantom. As will be described herein later, modular battery 14 is readily adapted to other sizes and capacities.

Figure 1:
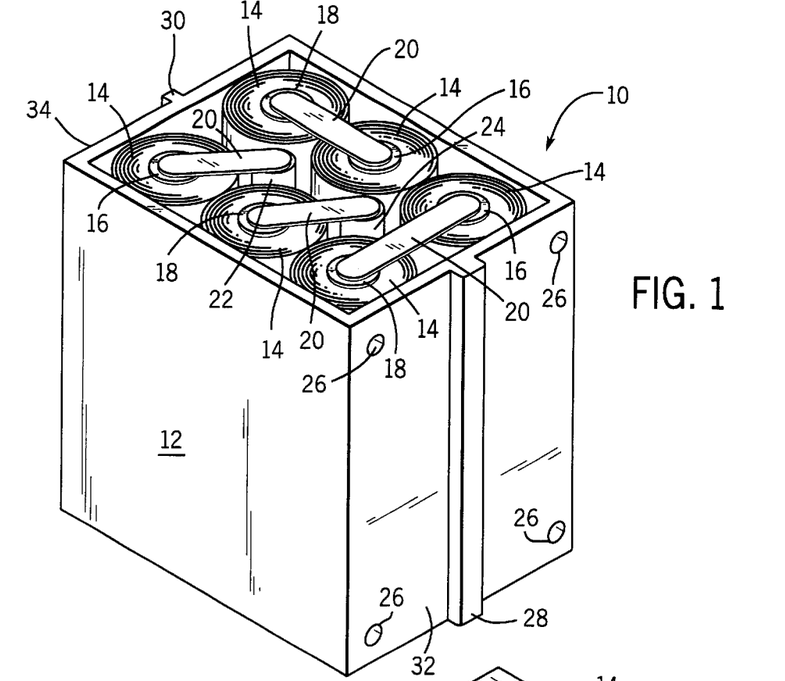
FIG. 1 is a perspective view of a modular battery in accordance with a preferred embodiment of the present invention with the top cover removed for clarity.
Figure 2:
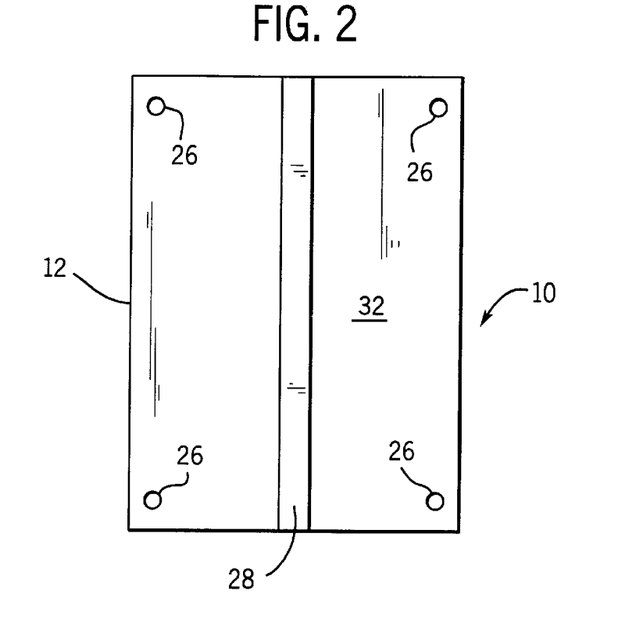
FIG. 2 is a side view of the modular battery shown in FIG. 1.
Figure 3:
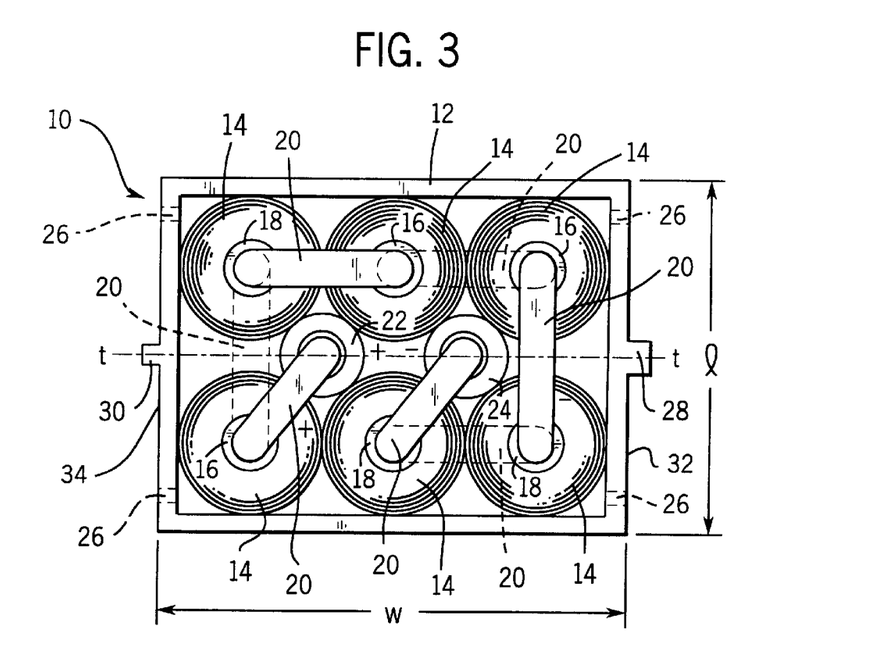
FIG. 3 is a top view of the modular battery shown in FIG. 1 with the top cover removed for clarity.
Figure 4:
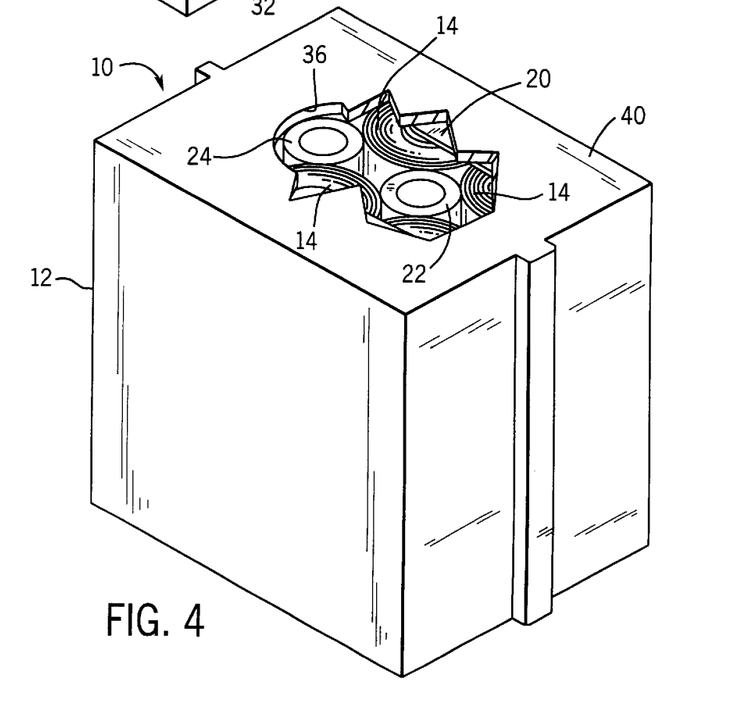
FIG. 4 is a bottom perspective view of the modular battery shown in FIG. 1 and illustrating the battery terminals.

With continued reference to FIGS. 1–4, housing 12 is formed with a plurality of apertures 26. In the event of the venting of gases by battery cells 14, apertures 26 allow for the escape of the these gases from housing 12. Apertures 26 are shown formed in side wall members 32 and 34 of housing 12, although it should be understood that apertures may be formed in fewer or more wall members as required to provide adequate venting for the battery cells 14. As best seen in FIG. 4, apertures (partially shown as 36) are formed in bottom 40 of housing 12 and provide access to terminals 22 and 24. Terminals 22 and 24 are preferably recessed with respect to bottom 40 and are contained entirely within housing 12 in order to reduce the potential for shorting terminals 22 and 24 during use, installation and/or storage of modular battery 10.

Figure 5:
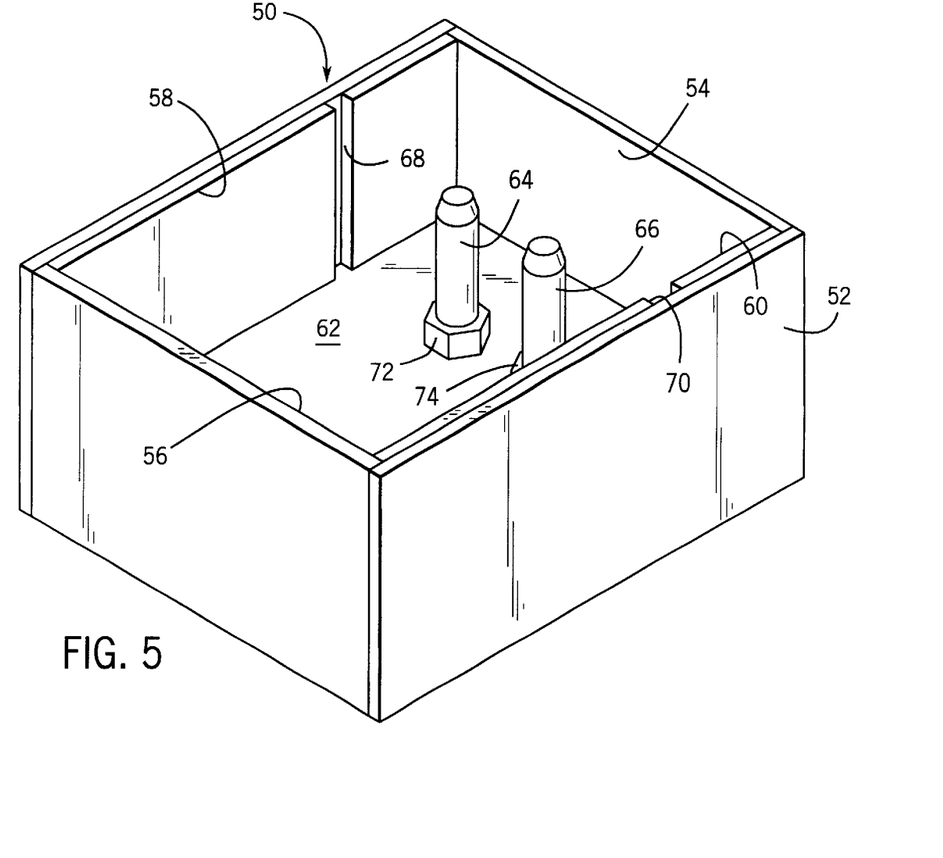
FIG. 5 is a perspective view of a base unit in accordance with a preferred embodiment of the present invention.
Figure 6:
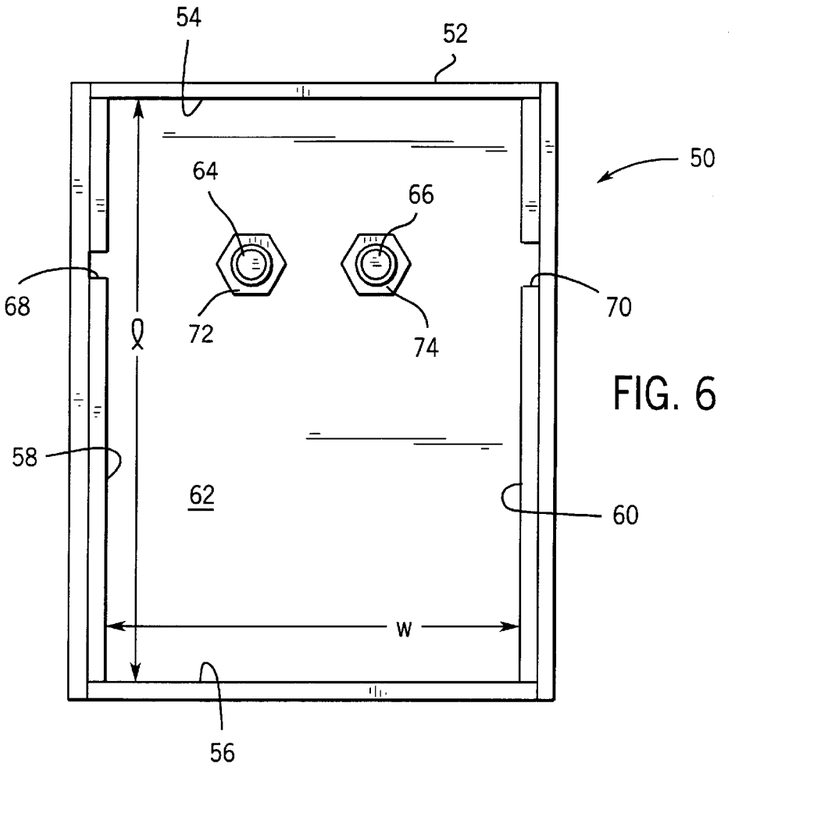
FIG. 6 is a top view of the base unit shown in FIG. 5.
Figure 7:
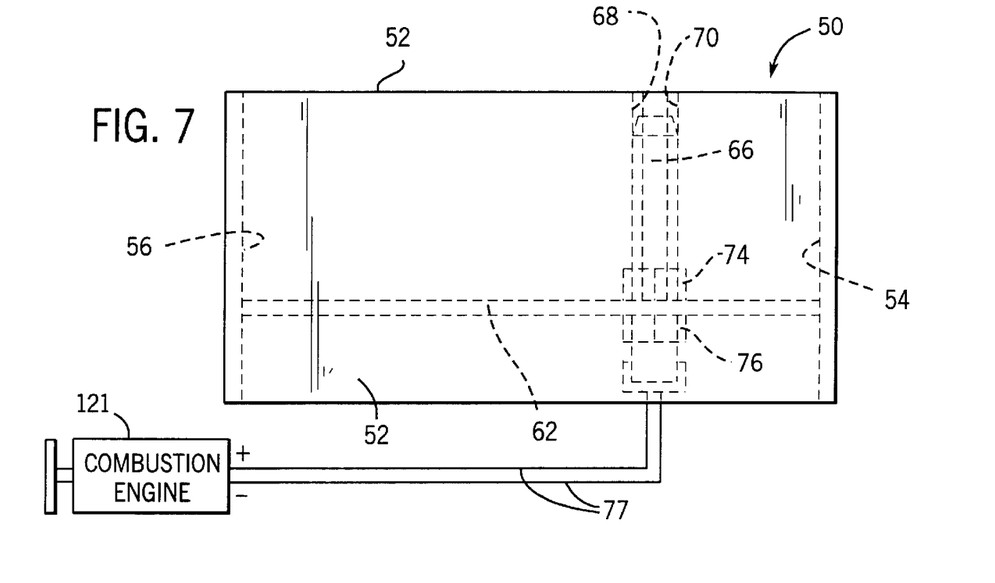
FIG. 7 is a side view of the base unit shown in FIG. 5 with the terminal receptors shown in phantom.

Referring now to FIGS. 5–7 base unit 50 includes housing 52 including wall members 54–60 and base member 62. Side wall members 58–60 are shown as double wall members, however, it may be preferred to form housing 52 as a single molded plastic piece. Mounted into base member 62 are positive and negative terminal posts 64 and 66, respectively. Terminal posts 64 and 66 are formed with a threaded end which is passed through apertures formed in base member 62. Nuts 72–76 secure terminal posts 64 and 66 to base member 62. It will be appreciated that suitable connectors 77, such as two cables, are provided and are coupled to terminal posts 64 and 66 for electrically coupling them to the electrically powered device.

Terminal posts 64 and 66 are a pair of cylindrical members of a suitable conductive material. Terminals 22 and 24 are a pair of annular members of a suitable conductive material and having an inside diameter sized to provide sliding, tool-less engagement with terminal posts 64 and 66, respectively, thereby electrically coupling modular battery 10 to base unit 50. In this manner, modular battery 10 is simply and easily electrically coupled to the powered device. It should be appreciated that terminals 22 and 24 and posts 64 and 66 need not be annular and cylindrical, respectively, but be of any configuration which provides quick, secure coupling of the battery module to the base unit without the use of tools.

With further reference to FIGS. 5–7 wall members 58 and 60 are formed with channels 68 and 70, respectively. Housing 12 is formed with first and second aligning members 28 and 30, respectively. Aligning members 28 and 30 are a pair a raised surfaces formed in side walls 32 and 34, respectively. Aligning members 28 and 30 are sized to respectively engage channels 70 and 68. Channel 70 and aligning member 28 have a slightly larger width than channel 68 and aligning member 30. This ensures that battery module 10 is inserted into base unit 50 in the correct orientation such that the terminals 64 and 66 align and engage with terminal posts 72 and 74, respectively, and a reverse polarity situation is avoided.

Figure 8:
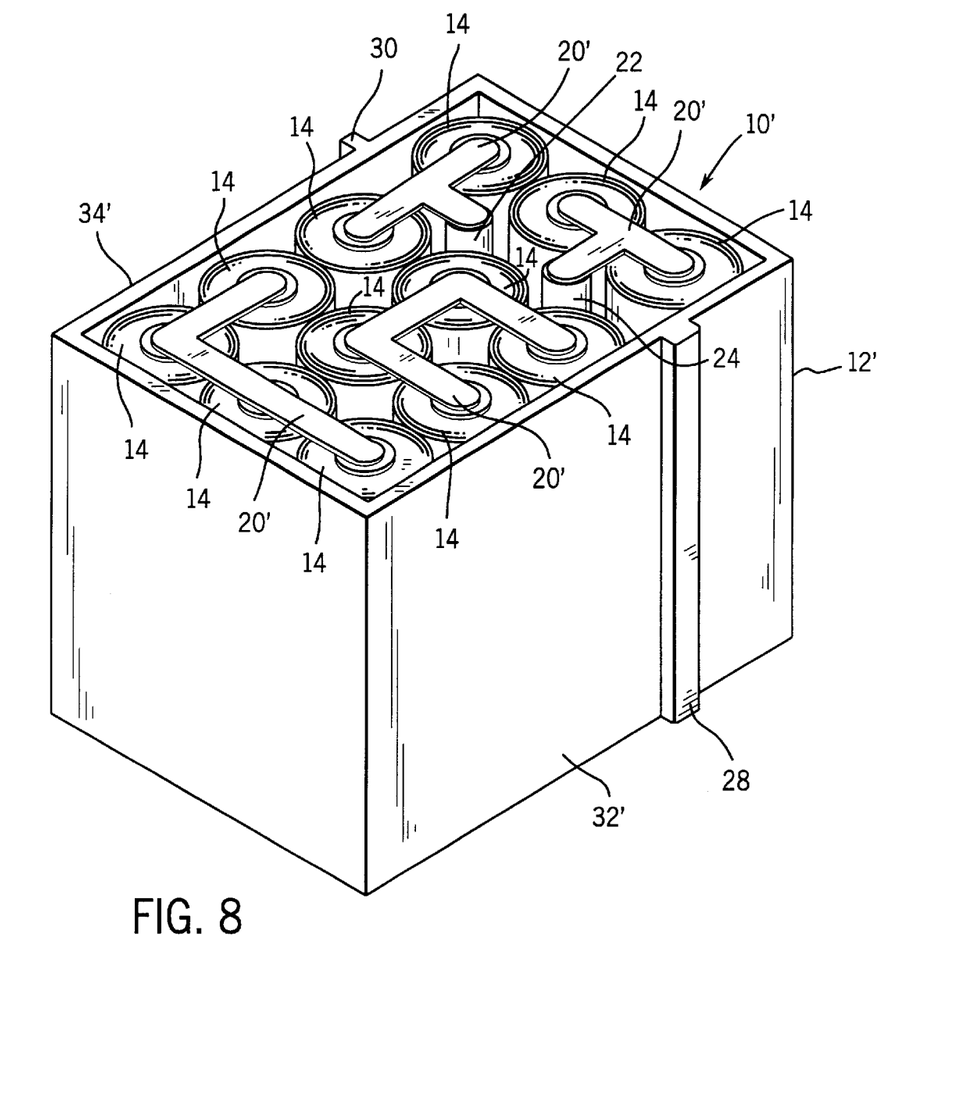
FIG. 8 is a perspective view of a modular battery in accordance with another preferred embodiment of the present invention with the top cover removed for clarity.
Figure 9:
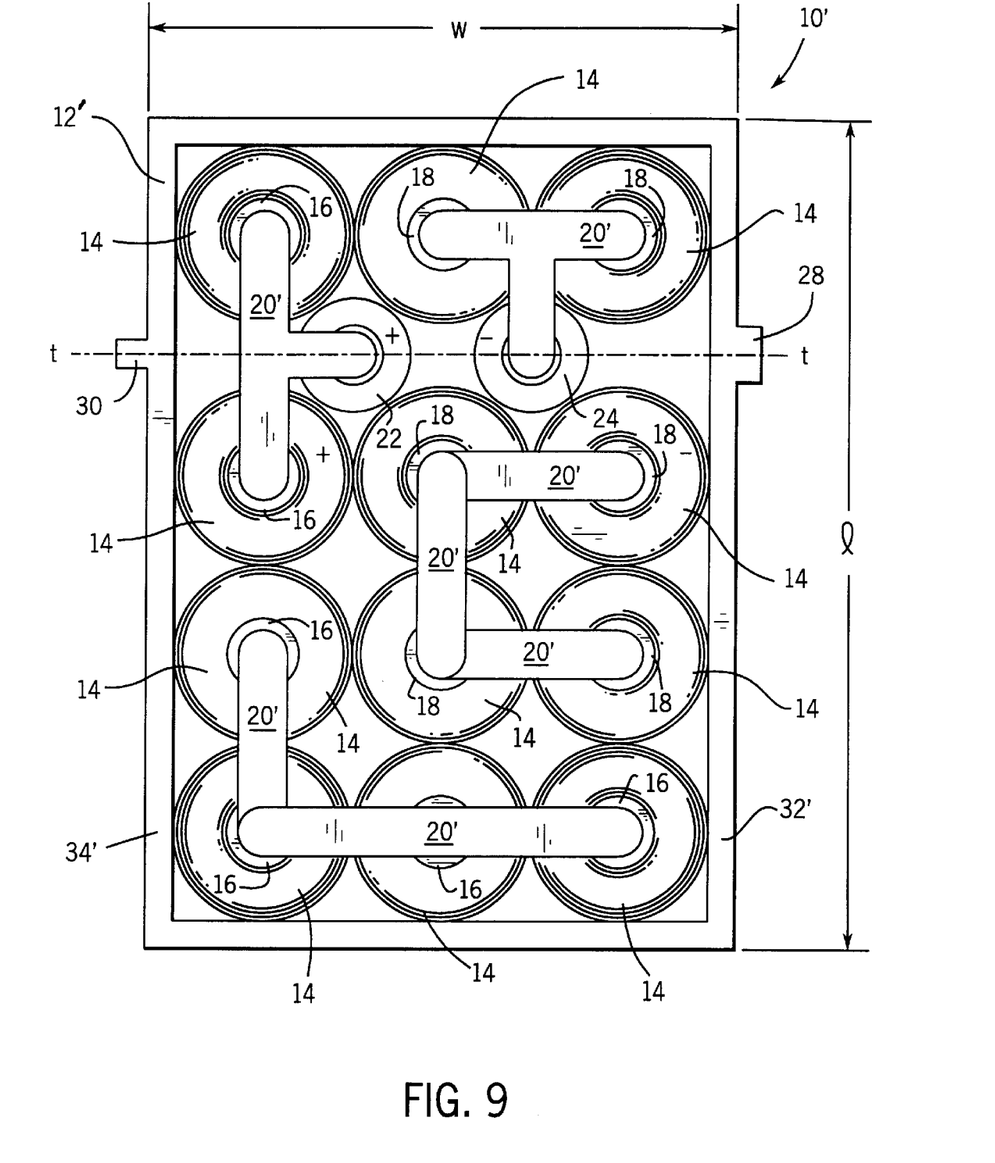
FIG. 9 is a top view of the modular battery shown in FIG. 8 with the top cover removed for clarity.

With reference now to FIGS. 8 and 9, a modular battery 10' of higher capacity is shown. Prime reference numerals are utilized to refer to elements which are similar to previously referenced elements but modified in accordance with the alternate preferred embodiment. As seen in FIGS. 8 and 9, modular battery 10' includes a housing 12' which is enlarged to receive twelve (12) battery cells 14. Battery cells 14 are interconnected and connected to positive and negative terminals 22 and 24, respectively, via straps 20' to form a twelve (12) volt, 2.4 amp hour capacity battery. As is noted from FIGS. 3 and 9, aligning members 28 and 30 are substantially aligned with terminals 22 and 24 along line t—t. Moreover, the width "w" of modular battery 10 and modular battery 10' is the same. The added capacity of modular battery 10' was created by increasing the length "l" of housing 12' and inserting additional battery cells 14. In this manner, terminals 22 and 24 are maintained in constant relationship with aligning members 28 and 30. More importantly, modular batteries 10 and 10' of different sizes may be accommodated by base unit 50 simply by providing a sufficient length "l" for base unit 50. It may be preferable to remove wall 56 providing acceptance of modular batteries of various capacities into base unit 50.

In operation, modular batteries of differing capacities can easily be coupled into an application. For example, if the application is starting the internal combustion engine of an automobile and the modular battery becomes discharged, the modular battery may be easily removed without the use of tools and a battery from another car or truck, a motorcycle, a lawn and garden tractor, and the like of suitable voltage and capacity may be substituted for starting the car. Hence, modular batteries 10 and 10' share certain common dimensions which ensure inter-changability and simplified battery replacement. Moreover, modular batteries 10 and 10' provide self aligning features to virtually eliminate improper installation. It will be further appreciated that modular batteries for different applications may be made with differing aligning features such that batteries from incompatible applications are not incorrectly substituted.

Figure 10:
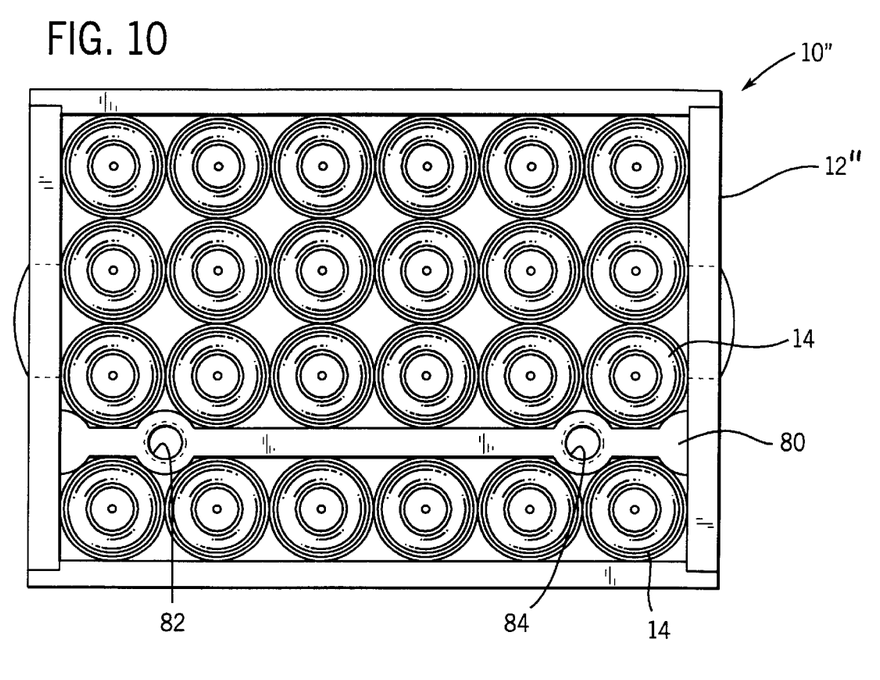
FIG. 10 is a top view of a modular battery in accordance with another preferred embodiment of the present invention with the top cover removed for clarity.
Figure 11:
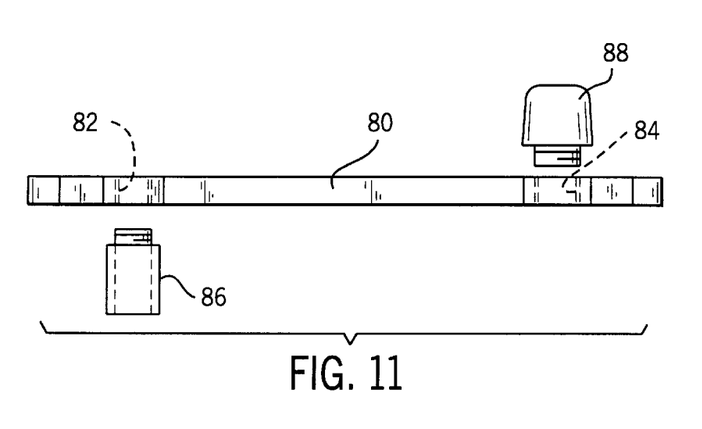
FIG. 11 is a side view of terminal support for use with the modular battery shown in FIG. 10.

FIGS. 10 and 11 illustrate still another embodiment of the modular battery 10". Modular batter 10' includes a housing 12" into which numerous battery cells 14 are inserted. Included within housing 12" is a terminal support member 80. In this arrangement a very high capacity modular battery may be formed. As will be appreciated strap members (not shown) are provided for interconnecting battery cells 14 into the desired capacity battery. Again, housing 12" is shown without a top it being understood that a suitable top member will be provided and secured to housing 12".

Terminal support 80 is a non-conductive support member into which positive and negative terminals may be secured in apertures 82 and 84 formed therein. Terminal support 80 may be adapted to threadably receive annular terminals 86 or post-type terminals 88 commonly found on SLI battery products. For exemplary purposes one each of an annular terminal 86 and a post terminal 88 are shown in FIG. 11 it being understood that in most application similar terminals will be adapted to support 80. Terminals 86 and 88 are suitably electrically coupled to battery cells 14, such as by straps (not shown). Hence, modular battery 12" may be configured as a replacement battery product for a traditional SLI battery.

Figure 15:
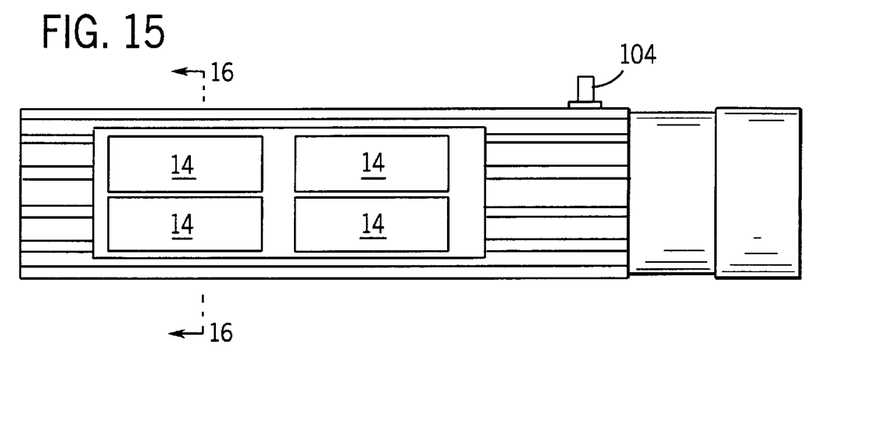
FIG. 15 is a side view of the flashlight/modular battery shown in FIG. 12 partially broken away to reveal the battery cells.
Figure 16:
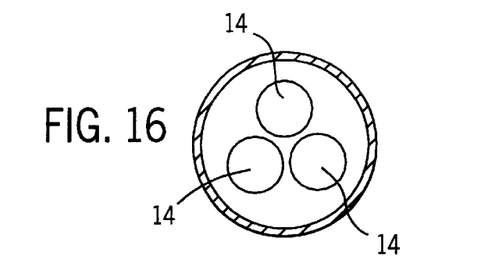
FIG. 16 is a cross-section view of the flashlight/modular battery shown in FIG. 12 and taken along line 16—16 of FIG. 12.

Referring now to FIGS. 12–16 an additional embodiment of the modular battery of the present invention is shown. In FIGS. 12–16 the modular battery of the present invention is configured as a flashlight 100. Flashlight 100 has a substantially cylindrical housing 102 formed with a plurality of axial ribs 103 for enhancing grip. At one end of flashlight 100 is a lamp assembly 106 including a lens 108, lamp 110 and reflector (not shown). At the other end of flashlight 100 is a pair of terminals 112 and 114. As seen in FIG. 15 contained within housing 102 are a plurality of battery cells 14 suitably coupled to receive and/or deliver electrical energy through terminals 112 and 114. Battery cells 14 are also coupled via switch 104 to provide electrical energy to lamp 110. Flashlight 100 is operated by selective activation of switch 104.

Figure 12:
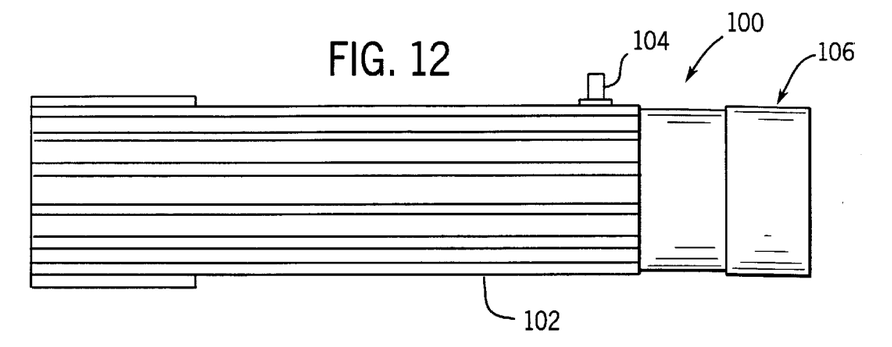
FIG. 12 is a side view of a flashlight/modular battery in accordance with a preferred embodiment of the present invention.
Figure 13:
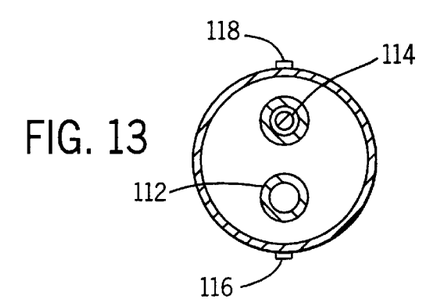
FIG. 13 is a bottom end view of the flashlight/modular battery shown in FIG. 12.
Figure 14:
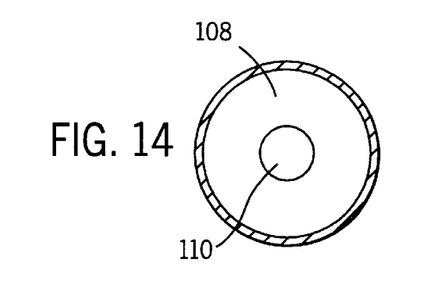
FIG. 14 is a lens view of the flashlight/modular battery shown in FIG. 12.

In a preferred embodiment, flashlight 100 is adapted to engage a base unit for receiving charge from a vehicle electrical system. In this regard, terminals 112 and 114 are sized and spaced to engage terminal posts 64 and 66 of base unit 50. In addition, aligning formations 116 and 118 are formed in the end of housing 102 for engaging channels 68 and 70 of base unit 50. In the preferred embodiment, the vehicle is adapted with a second base unit into which flashlight 100 is secured for most vehicle operation. When a need arises for a light source flashlight 100 may be removed from the base unit and used. In the event of discharge of the starter battery, flashlight 100 may further be used as the energy source for starting the car or truck. In this regard, the starter battery is removed from base unit 50 and flashlight 100 inserted in its place. Since flashlight 100 is normally maintained at a full state of charge, it possess sufficient energy to start the vehicle. It may be preferable to configure flashlight 100 in a voltage slightly greater than the standard starting battery voltage. This configuration would provide an increased pulse for starting applications without substantially increasing the overall volume of flashlight 100.

Figure 17:
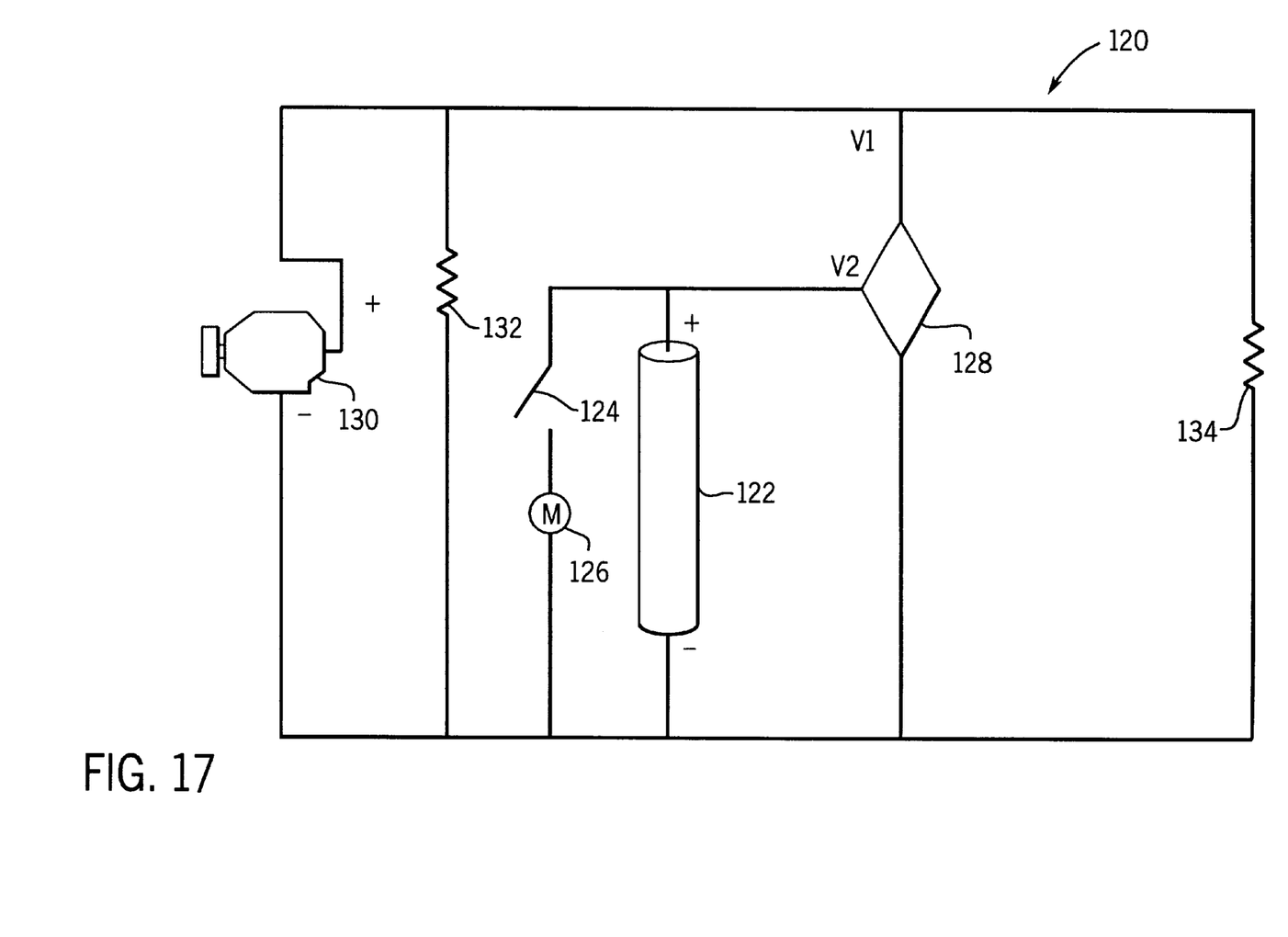
FIG. 17 is a schematic illustration of an electrical system adapted in accordance with a preferred embodiment of the invention for starting the internal combustion engine of a motor vehicle.

Referring now to FIG. 17 an electrical circuit 120 for starting the internal combustion engine 121 (see FIG. 7) of a typical motor vehicle and charging the starting battery is shown. A modular battery system 122, including a modular battery and base unit in accordance with preferred embodiments of the present invention, is electrically coupled via switch 124 to starting motor 126 and directly to controller 128. Controller 128, as is well known in the art, may embody dedicated circuitry or may be integrated into an engine/powertrain control module associated with the internal combustion engine 121 driven application. Controller 128 functions to regulate the voltage (V1) delivered from alternator 130 in response to being driven by the internal combustion engine 121 to other electrical loads (represented as essential loads 132 and other loads 134) of the application. Controller 128 further functions to regulate current flow in response to the charge state of the modular battery of modular battery system 122 for charging the modular battery. For starting the internal combustion engine 121 of the application, switch 124 is closed allowing current to flow from battery system 122 to motor 126 which is coupled to the internal combustion engine 121 as is very well known in the art.

Figure 18:
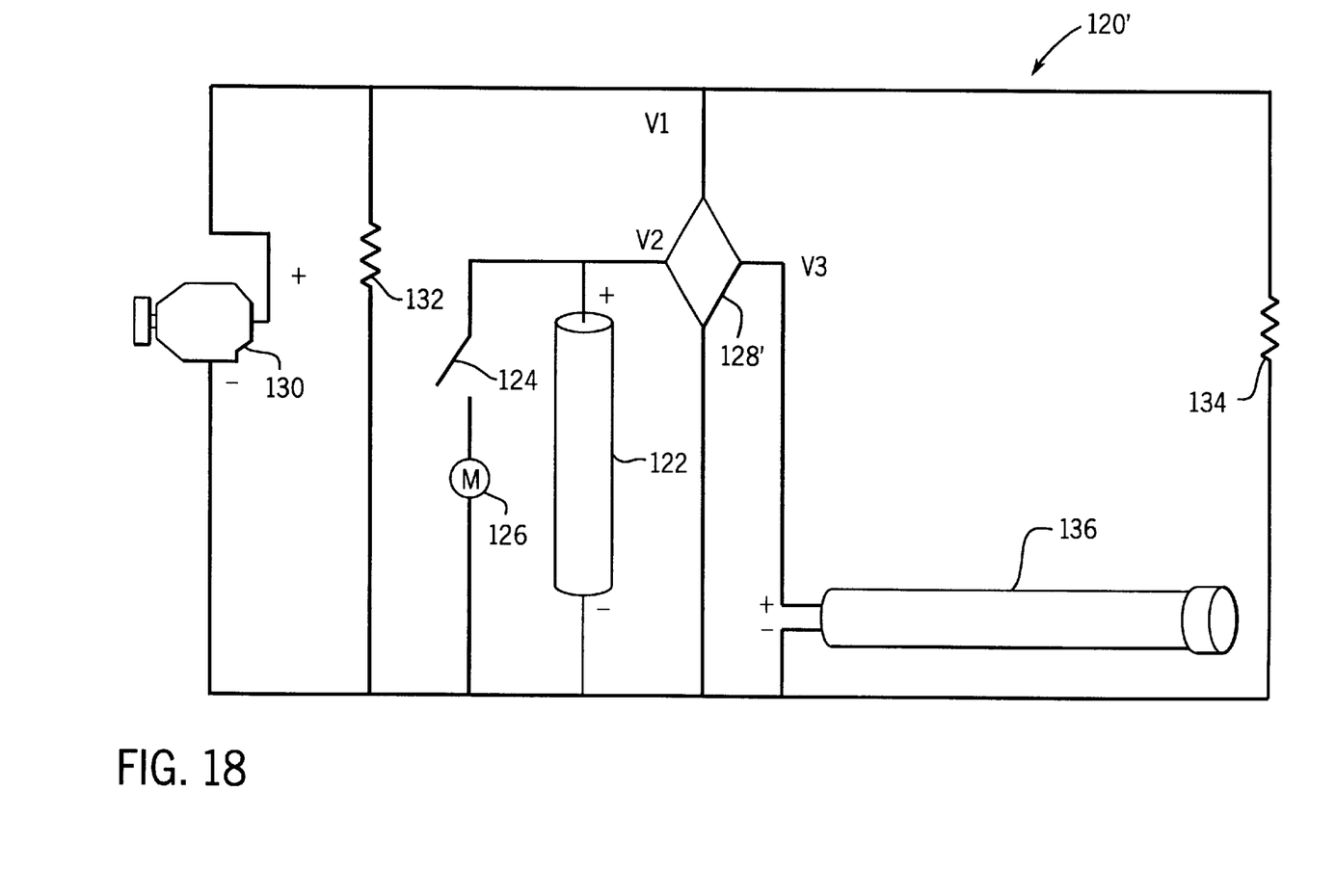
FIG. 18 is a schematic illustration of an electrical system adapted in accordance with a second preferred embodiment of the invention for starting the internal combustion engine of a motor vehicle.

In FIG. 18, an electrical circuit 120' similar to that of FIG. 17 is shown but is adapted with a second modular battery system 136, in accordance with another preferred embodiment of the present invention. Second modular battery system 136 is coupled to controller 128' which functions similar to controller 128 and further regulates a flow of current in response to the charge state of the modular battery of second modular battery system 136 for maintaining the modular battery at a substantially full state of charge. That is, during normal operation of the application, the charge of the modular battery in system 136 is maintained. As illustrated, system 136 may embody a flashlight configuration as described above or may simply embody a second modular battery. The second modular battery is available for additional functions such as being adapted with a flashlight attachment or adapted to other electrically powered devices.

Preferably the second modular battery is also adaptable to first battery system 122. That is, in the event that the modular battery of system 122 becomes discharged, it may be removed from system 122 and the modular battery of system 122 substituted therefore for providing electrical energy for starting the internal combustion engine 121. With sufficient voltage protection designed into controller 128, after the internal combustion engine 121 is started, the second modular battery may be removed from system 122 and the first modular battery reinstalled to receive charge. Alternatively, the discharged modular battery may be coupled to the system 136 and allowed to charge during operation of the application and later replaced into system 122.

Figure 19:
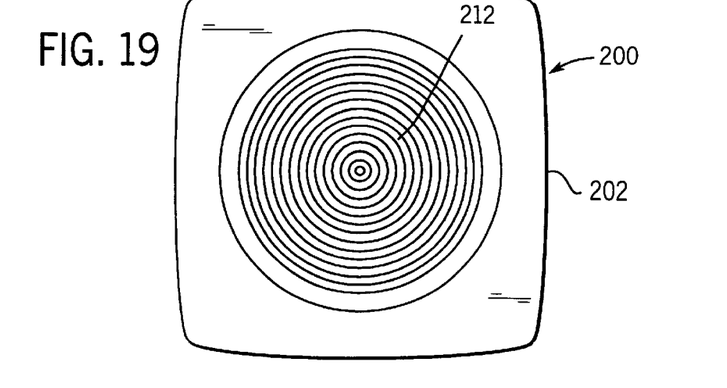
FIG. 19 is a front view of a light attachment for a modular battery in accordance with a preferred embodiment of the present invention.
Figures 20, 21:
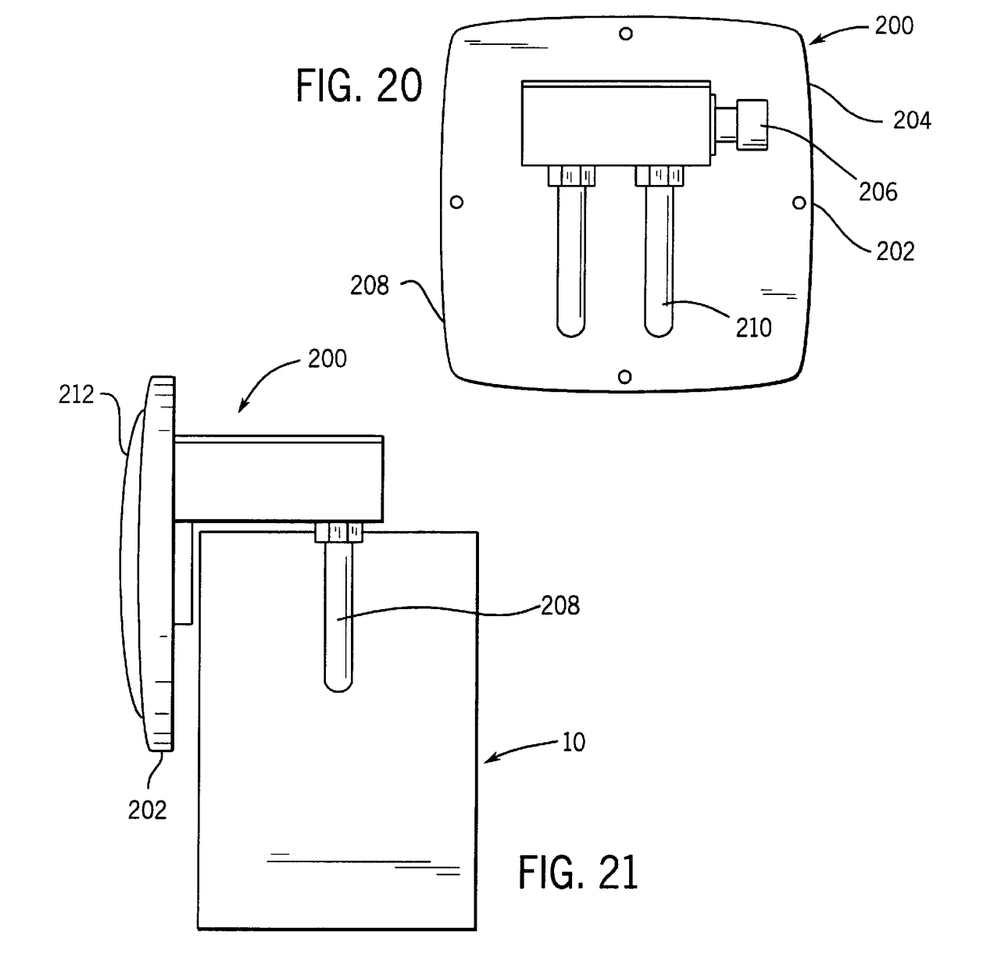
FIG. 20 is a rear view of the light attachment shown in FIG. 19.
FIG. 21 is a side view of the light attachment shown in FIG. 19 and further illustrating a modular battery for clarity.

Referring now to FIGS. 19–21 the modular battery of the present invention may be adapted for numerous other applications beyond the SLI function. In FIGS. 19–21 a lamp attachment 200 includes a light housing member 202, a switch housing 204, switch 206, terminal posts 208 and 210. Mounted into light housing member 202 is lens 212 behind which is secured a lamp and reflector (not shown) which is of standard flashlight construction. The lamp is electrically coupled into switch housing 204 within which it is switchably coupled via switch 206 to terminal posts 208 and 210. In accordance with the present invention, terminal posts 208 and 210 are configured and spaced to engage the standard spacing of the terminals 22 and 24 of modular battery 10. In this manner, lamp attachment is easily secured to modular battery 10 for providing electrical energy to switch housing 204. Selective activation of switch 206 couples modular battery 10 to the lamp. Lamp attachment 200 may be carried within a car. Should a light source be required, modular battery 10 may be easily removed from base unit 50 and light attachment 200 secured thereto. In a preferred arrangement, the car or truck is equipped with a second modular battery which may be utilized for providing an energy source.

The present invention has been disclosed and described in terms of several preferred embodiments. One of ordinary skill in the art will readily appreciate its many applications and its fair scope as defined in the subjoined claims.

We claim:

1. A system for providing electrical power to a device comprising:
   a battery module having a housing containing at least one electrochemical cell connected to first and second terminals and being adapted to allow access to the terminals, the housing also defining plural differently sized aligning members; and
   a base unit having first and second terminal posts and first and second connectors opposed to and electrically coupled to the terminal posts, the connectors being adapted for electrical coupling to the device, the base unit also having plural complementary channel members sized to engage the respective differently sized aligning members, said differently sized aligning members and complementary channel members so positioned to ensure proper electrical connection;
   wherein the battery module can be inserted into the base unit only if the differently sized aligning members are engaged with the respective complementary channel members, so that when the battery module is within the base unit the first terminal is electrically coupled with the first terminal post and the second terminal is electrically coupled with the second terminal post.

2. The system of claim 1 wherein the connectors are electrically coupled to the device.

3. The system of claim 2 wherein the device comprises a starting circuit for an internal combustion engine of an internal combustion engine powered device.

4. The system of claim 3 wherein the internal combustion engine powered device comprises one of: a motor vehicle, a tractor, a motorcycle, an all-terrain vehicle, a snowmobile, a marine craft, a lawn and garden power tool, and an aircraft.

5. The system of claim 4 wherein the base unit is adapted to be coupled to one of a top terminal type connector or a side terminal type connector of the starting circuit.

6. The system of claim 4 wherein the base unit includes an adapter, the adapter being configured to couple to one of a top terminal and a side terminal type connector of the starting circuit.

7. The system of claim 2 wherein the device comprises an uninterrupted power supply system.

8. The system of claim 2 wherein the device comprises a power system of a hybrid electric vehicle.

9. The system of claim 2 wherein the base unit is formed integral with the device.

10. The system of claim 2 wherein the electrochemical cell comprises a spiral wound thin metal film cell.

11. The system of claim 2 wherein the battery module comprises a plurality of electrochemical cells, the cells being coupled to each other and to the terminals.

12. The system of claim 2 wherein the aligning member comprises at least one ridge member formed in the housing and a complementary channel member formed in the base unit for each ridge member.

13. The system of claim 1 wherein the battery module is adapted to one of a plurality of capacities.

14. The system of claim 13 wherein the aligning member retains substantially identical physical attributes for each of the plurality of capacities.

15. The system of claim 14 wherein the first and second terminals are in spaced relationship to the aligning member for each of the plurality of capacities.

16. The system of claim 15 wherein the terminals are aligned with the aligning formation for each of the plurality of capacities.

17. The system of claim 13 wherein the base unit is adapted to accept battery modules of each of the plurality of capacities.

18. The system of claim 1 wherein the housing has apertures for allowing access to the terminals and the terminals are recessed within the housing.

19. A modular battery system for internal combustion engine starting comprising:

a battery module having a housing containing at least one electrochemical cell coupled to first and second terminals and being adapted to allow access to the terminals, the housing also defining plural different sized aligning members; and a base unit having first and second terminal posts and first and second connectors opposed to and electrically coupled to the terminal posts, the connectors being electrically coupled to a starting and charging circuit of an internal combustion engine, the base unit also having plural complementary channel members sized to receive the respective differently sized aligning members, said differently sized aligning members and complementary channel members so positioned to insure proper electrical connection;

wherein the battery module can be inserted into the base unit only if the differently sized aligning members are is engaged with the respective complementary channel members, so that when the battery module is within the base unit the first terminal is electrically coupled with the first terminal post and the second terminal is electrically coupled with the second terminal post.

20. The modular battery system of claim 19 wherein the electrochemical cell comprises a spiral wound thin metal film cell.

21. The modular battery system of claim 19 wherein the battery module comprises a plurality of electrochemical cells, the cells being coupled to each other and to the terminals.

22. The modular battery system of claim 20 wherein the first and second connectors comprise first and second battery cables adapted for connection to the starting circuit.

23. The modular battery system of claim 19 wherein the aligning member comprises at least one ridge member formed in the housing and a complementary channel member formed in the base unit for each ridge member.

24. The modular battery system of claim 19 wherein the battery module is adapted to one of a plurality of capacities.

25. The modular battery system of claim 24 wherein the aligning member retains substantially identical physical attributes for each of the plurality of capacities.

26. The modular battery system of claim 25 wherein the base unit is adapted to accept battery modules of each of the plurality of capacities.

27. The modular battery system of claim 25 wherein the first and second terminals are in spaced relationship to the aligning member for each of the plurality of capacities.

28. The modular battery system of claim 27 wherein the terminals are aligned with the aligning member for each of the plurality of capacities.

29. The modular battery system of claim 19 wherein the housing has apertures for allowing access to the terminals and the terminals are recessed within the housing.

* * * * *